United States Patent Office 3,478,881
Patented Nov. 18, 1969

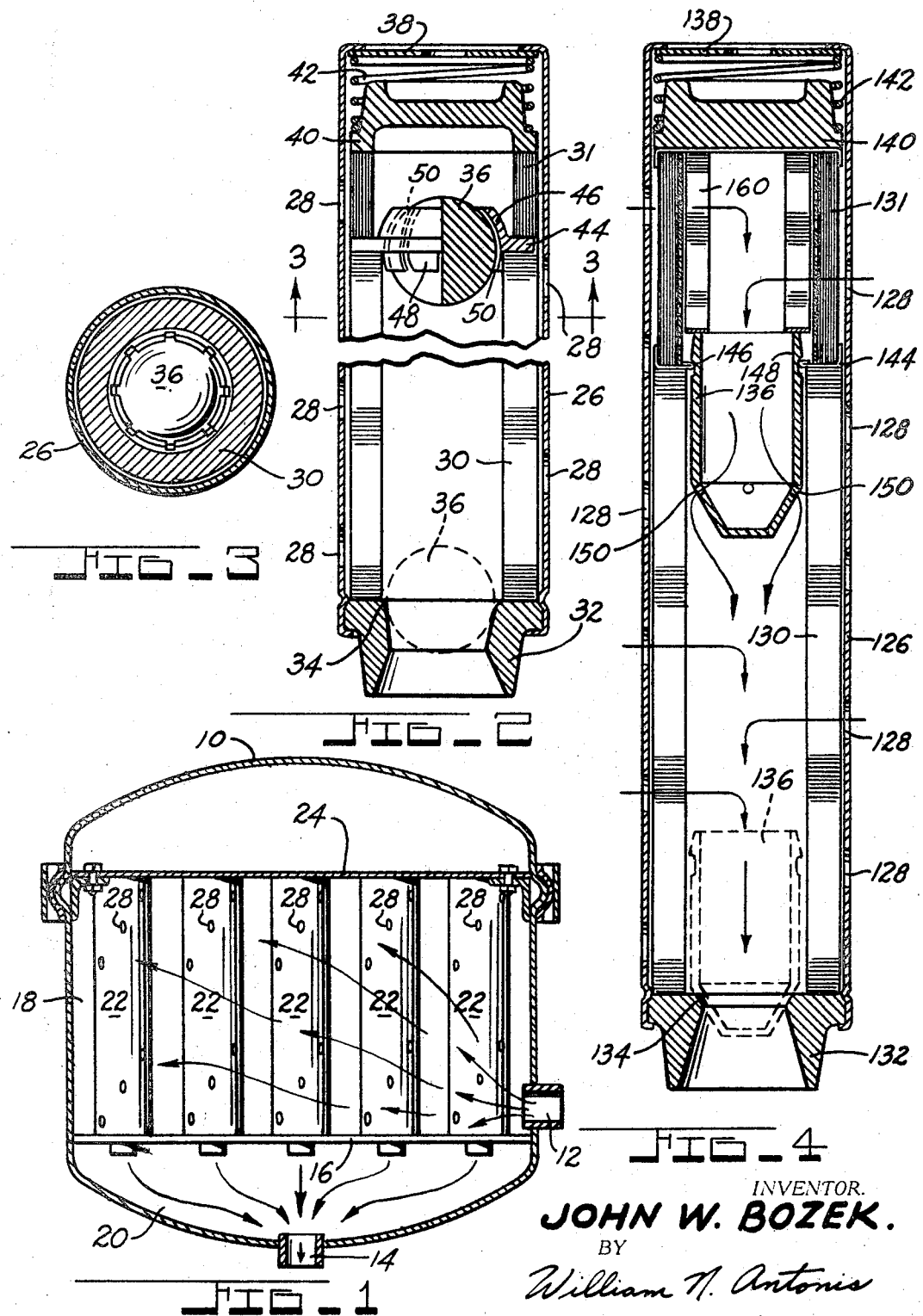

3,478,881
SHUT-OFF VALVE FOR FUSE FILTER
John W. Bozek, Madison Heights, Mich., assignor to The Bendix Corporation, a corporation of Delaware
Filed July 3, 1967, Ser. No. 650,951
Int. Cl. B01d 35/14, 33/38
U.S. Cl. 210—96
12 Claims

ABSTRACT OF THE DISCLOSURE

A positive shut-off valve for interrupting the flow of fuel through a fuse filter element of a fuel-monitoring device in the event such fuel contains free water. The fuse-filtering element is formed of a lower compressible section and an upper non-compressible section between which is sandwiched a valve retainer. A valve member which is engaged by the valve retainer is moved into the outlet port when the resultant forces acting on the valve member exceed a predetermined value. The resultant forces acting on the valve member will exceed the predetermined value only when the fuel contains water contaminants and not when the fuel contains only solid contaminants.

BACKGROUND OF THE INVENTION

In most present-day refueling installations, fuel-monitoring devices of the type described in Kasten Patent No. 3,117,925, are located downstream of conventional filter water separators. In such installations a fuel-monitoring device will normally operate for long periods of time without being exposed to large amounts of contamination. During such normal operations the pressure drop through the fuel-monitoring device will build up gradually and the fuse elements will be replaced after a scheduled time interval., e.g., six months, or when the pressure differential across the fuse element reaches a predetermined value, e.g., 15 to 20 p.s.i. Under such conditions the fuse elements of the fuel-monitoring device will retail all, or most all, of the solid and water contaminants in the fuel flowing therethrough.

More recently in many installations fuel-monitoring devices have been effectively utilized in place of filter water separators rather than in combination therewith. Even in such installations, if the fuel is of average quality, that is, contains only relatively small quantities of water and solid contamination, the fuse elements will have no difficulty in retaining or trapping the contamination. However, in such installations certain operating conditions can occur which will cause small quantities of water to seep between the layers forming the edge-type fuse elements and flow to the outlet port of the fuel-monitoring device. For example, if the fuel-monitoring device is used in place of a filter water separator and the device is used at a fraction of its rated flow (25% or less), and if, in addition, a pumping system used to pump the fuel to the device has only a rather limited low operating pressure, then in those situations when the fuel flowing therethrough is contaminated with a high percentage of water it will be possible for some of the water to seep through the fuse elements. The reason for this is that under such conditions of limited flow and low pumping pressure the piston in the fuse element cannot compress the edge-type filter element sufficiently to completely close off the pores between the layers and prevent further flow through the element. Thus, under such conditions water can, in effect, "seep" through the elements.

In previous devices the shut-off valves have been exposed to the full pressure differential existing between the outside and inside of the fuse filtering element. In the device disclosed and claimed hereafter the shut-off valve is exposed only to the differential pressure existing between two different sections of the fuse filtering element interior. Passage means are utilized for permitting flow from one side of the valve means to the other.

SUMMARY OF THE INVENTION

In view of the foregoing, it is an object of this invention to provide a fuel-monitoring device which will function properly under all foreseeable operating conditions.

Another object of this invention is to provide a novel fuse element construction which will prevent water seepage therethrough.

In other words, it is an object of this invention to provide a "seepage-proof" fuse element for use in a fuel-monitoring device.

More specifically, it is an object of this invention to provide a tubular fuse element construction having a lower compressible section and an upper non-compressible section, and a releasable valve member located within the tubular element at the junction of the lower and upper sections, wherein the valve member will be caused to move from its normal position into the outlet port of the fuse element to prevent further flow therethrough when the resultant forces acting on the valve member exceed a predetermined value.

Another object of this invention is to provide a tubular fuse element construction of the foregoing type wherein the resultant forces acting on the valve member will exceed the predetermined value to cause movement of the valve member into the outlet port only when the fuel contains water contaminants.

The further object of this invention is to provide a fuse element construction having a shut-off valve therein which is not actuated by a predetermined pressure drop through the fuse element.

The above and other objects and features of this invention will become apparent from the following description taken in connection with the accompanying drawings.

BRIEF DESCRIPTION OF THE DRAWINGS

FIGURE 1 is a view partially in section of a fuel-monitoring device containing a plurality of filter units each of which incorporates the invention;

FIGURE 2 is an enlarged fragmentary sectional view of a filter or fuse unit incorporating the invention and showing the shut-off valve in various positions;

FIGURE 3 is a sectional view taken along line 3—3 of FIGURE 2; and

FIGURE 4 is an enlarged sectional view of a filter or fuse unit incorporating another embodiment of the invention and showing the shut-off valve in various positions.

DESCRIPTION OF THE PREFERRED EMBODIMENTS

Referring to FIGURE 1 of the drawings it will be seen that numeral 10 indicates a tank having a fuel inlet port 12 and fuel outlet port 14. Suitably attached to the housing is a partition 16 which separates the interior of the housing into an inlet chamber 18 and outlet chamber 20. A plurality of filter or fuse units 22 are suitably attached to partition 16 and are retained in position by a retainer plate 24 which is suitably connected to the housing 10. The direction of flow through the tank is indicated by the arrows.

Each filter or fuse assembly 22, as shown in FIGURE 2, includes a metal tube 26 having a plurality of perforated inlet ports 28 surrounding a porous tubular filtering element having a lower compressible section 30 formed from a plurality of washers in registered face-to-face contact and an upper non-compressible section 31 formed of any suitable material such as pleated metal mesh or paper. The washers which are used in the lower section 30 of the filtering element may be formed from paper, cellulose, or other suitable fibrous or non-fibrous materials and are arranged so that flow through the filter element will be via the radially extending pores formed between the washers. The lower section 30 of the filtering element may also be formed by utilizing a ribbon-like material wound edgewise. The method for winding and making the ribbon-type element is disclosed and claimed in Kasten Patent No. 2,421,704. In the arrangement shown in FIGURE 1 flow will be from outside the filter element to inside the filter element. For additional details regarding this general type of fuse assembly reference may be made to Kasten's Patent No. 3,117,925, and Kasten's Patent No. 3,151,071.

A nipple-like ferrule 32, which is suitably connected to one end of the tube and is in abutment with the compressible end of the filter element, is formed with a valve seat 34 for receiving a valve member indicated generally by the numeral 36. A perforated retainer washer 38 is located at the other end of the tube and a piston-type endplate 40 is located at, and is in abutment with, the non-compressible end of the filter element. A preloaded spring 42 is located between the retainer washer 38 and the endplate 40 for placing the compressible section 30 of the filter element under the desired calibrated precompression. A retainer member has a flanged portion 44 sandwiched between the lower section 30 and the upper section 31 of the filter element and a socket portion 46 for engaging the ball valve 36 and retaining it therein. The socket portion of the retainer member is formed with lip-like yieldable ends 48 which permit ejection of the ball valve member. Passages 50 are located in the socket 46 for permitting flow from inside the non-compressible section 31 to the inside of the compressible section 30.

In a fuse element of the foregoing construction most of the flow will take place through the lower compressible washer stack 30. The balance of the fluid will pass through the non-compressible upstream section 31 and then through the passages around the ball valve 36. Although passage of the fluid around the ball valve will cause a pressure drop between the upper and lower sections of the fuse, this differential will not normally be great enough to dislodge the ball.

The flow ratio through the upper and lower sections of the fuse element will not be significantly altered by solid contaminants in the fuel, since the solid contaminants will accumulate on the outer surface of both sections and will proportionately increase the flow resistance of each section. More specifically, the compressibility of the downstream washer stack 30 will accelerate the increase in flow resistance of this portion and will tend to force more of the flow through the non-compressible upper section. The increased flow, however, will result in a more rapid accumulation of the solid contaminants and an increase in flow resistance. The net effect of solid contaminants in the fuel will, therefore, be an increase in the pressure outside of the fuse element with only a minor change in the pressure differential across the ball valve 36.

On the other hand water in the fuel will have a much different effect. The water will be absorbed by the paper washers of the lower compressible section 30 and the full resistance of this section will increase rapidly. The flow resistance of the upper non-compressible section 31, however, is only slightly affected by the water, if affected at all. This section may be designed to respond to water in one of three ways. It may have a hydrophobic surface which repels and sheds water drops, or it may absorb a quantity of water without a dimensional change, or it may be designed to freely pass water. In any case the water causes only a relatively small increase in the flow resistance of the upper section in comparison to that of the lower paper washer section. As the difference in flow resistance of the two sections becomes greater a higher percentage of the total flow will pass through the non-compressible section and around the ball valve. When the flow around the ball valve reaches a predetermined value the resulting pressure drop across the ball valve will become great enough to eject the ball and drive it into the nipple seat to shut off further flow through the fuse outlet port.

In the embodiment shown in FIGURE 4, like parts are designated by like numerals plus 100. The fuse element is again composed of a lower compressible section 130 and an upper non-compressible section 131. The lower compressible section is composed of the previously described compressible paper washers and the upper section is composed of any suitable material such as pleated metal mesh or paper. A retainer member 144 which functions as a division plate between the upper and lower section is formed with an inner annular edge 146 for engaging a yieldable annular lip-like portion 148 formed on the valve member 136. Located within the upper non-compressible section 131 is a tubular element 160 having one end thereof in abutment with the endplate 140 and the other end thereof in abutment with the open end of the valve member 136. The tubular element 160 is formed of any suitable medium which absorbs and expands when in contact with water. If desired, the element 160 can be formed of the same type of washers in registered face-to-face contact as those which were used in the lower section 130. Thus, referring to FIGURE 4, it will be apparent that the non-compressible section 131, which is designed to permit free passage of water droplets, will retain any solid contaminants in the fuel. The inner section, that is element 160, will absorb the water contaminants in the fuel and will expand upon the occurrence of such absorption. The inner edge 146 of the retainer member which engages the projecting lip 148 on the piston valve will hold the valve in place so that the end of the piston places an axial load on the water-sensitive tubular element 160. Although a portion of the total flow passes through the upper section 131 and the tubular element 160 and then through the openings 150 in the forward end of the piston, the pressure drop across the piston produced by this flow is not great enough to force the piston out of engagement with the retaining member 144. However, when the fuel contains water contaminants, the tubular element 126 within the upper section 131 will absorb the water and expand longitudinally thereby exerting a force on the piston 136. This force combined with the pressure differential force existing across the piston will eject the piston from the grasp of the retainer member. The released piston will then be driven down through the fuse element and will be seated in the nipple outlet to prevent further flow through the outlet port.

Those acquainted with this art will readily understand that the invention set forth herein is not necessarily limited and restricted to the precise and exact details presented in the two embodiments and that various additional changes and modifications may be resorted to without departing from the spirit of my invention. Accordingly, I do not desire to be limited to the specific details described herein primarily for purposes of illustration.

Having thus described the various features of the invention what I claim as new and desire to secure by Letters Patent is:

1. A filter unit comprising a housing having a plurality of inlet ports and a single outlet port therein, a tubular filtering element located within said housing for permitting flow of fluid therethrough from the outside of the element to the inside of the element and having a lower compressible section and an upper non-compressible section, said tubular element having the compressible end thereof in abutment with said housing and in alignment with said outlet port, a piston-type endplate in abutment with and closing the non-compressible end of said tubular element, means for placing the compressible section of said tubular element under a predetermined precompression, valve means located within said tubular element at the junction of said lower and upper sections and including a detachable valve member, and passage means for permitting flow of fluid from the inside of said upper section to the inside of said lower section, said valve member having one side thereof exposed to the fluid pressure inside said upper section and the other side thereof exposed to the fluid pressure inside said lower section, said valve member co-acting with said tubular element and said outlet port so that when the resultant forces acting on said valve member exceed a predetermined value the valve member will be detached and moved from its normal position into said outlet port to prevent further flow therethrough.

2. A filter unit, as defined in claim 1, wherein said valve means includes a retainer member having a first portion sandwiched between said lower and upper sections of said tubular element and a second portion located within said tubular element for engaging said valve member and retaining same in its normal position.

3. A filter unit, as defined in claim 2, wherein yieldable lip means are formed on one of said members for engaging the other of said members.

4. A filter unit, as defined in claim 3, wherein said yieldable lip means comprise a lip formed on said retainer member.

5. A filter unit, as defined in claim 4, wherein said passage means are located between said valve and retainer members.

6. A filter unit, as defined in claim 5, wherein said passage means are grooves formed in said retainer member.

7. A filter unit, as defined in claim 3, which includes means located between said endplate and said valve member for exerting an axial force on said valve member tending to release said valve member from said retainer member.

8. A filter unit, as defined in claim 7, wherein said last-named means is formed of a material which will absorb water and expand longitudinally so that the axial force exerted thereby on said valve member will increase.

9. A filter unit, as defined in claim 7, wherein said yieldable lip means comprise a projecting lip on said valve member.

10. A filter unit, as defined in claim 9, wherein said passage means extend through said valve member.

11. A filter unit, as defined in claim 10, wherein said valve member is a hollow substantially U-shaped member.

12. A filter unit, as defined in claim 11, wherein the force exerting means located between said endplate and said valve member is a tubular layered edge-type compressible filtering element.

References Cited

UNITED STATES PATENTS

| | | | |
|---|---|---|---|
| 3,151,071 | 9/1964 | Kasten | 210—232 |
| 3,339,734 | 9/1967 | Kasten | 210—96 |
| 3,339,735 | 9/1967 | Kasten | 210—100 |
| 3,357,560 | 12/1967 | Raupp | 210—96 |
| 3,367,503 | 2/1968 | Topol | 210—96 |
| 3,406,827 | 10/1968 | Topol et al. | 210—96 |
| 3,416,665 | 12/1968 | Kasten | 210—96 |
| 3,416,666 | 12/1968 | Kasten | 210—96 |
| 3,434,486 | 3/1969 | Kasten | 210—96 X |

REUBEN FRIEDMAN, Primary Examiner

W. S. BRADBURY, Assistant Examiner

U.S. Cl. X.R.

137—461; 210—97, 100